(12) United States Patent
Qi et al.

(10) Patent No.: US 11,503,057 B2
(45) Date of Patent: Nov. 15, 2022

(54) INTRUSION DETECTION METHOD AND SYSTEM FOR INTERNET OF VEHICLES BASED ON SPARK AND COMBINED DEEP LEARNING

(71) Applicant: Nanjing University of Science and Technology, Nanjing (CN)

(72) Inventors: Yong Qi, Nanjing (CN); Jianye Yu, Nanjing (CN)

(73) Assignee: Nanjing University of Science and Technology, Nanjing (CN)

(*) Notice: Subject to any disclaimer, the term of this patent is extended or adjusted under 35 U.S.C. 154(b) by 0 days.

(21) Appl. No.: 17/506,607

(22) Filed: Oct. 20, 2021

(65) Prior Publication Data

US 2022/0217170 A1 Jul. 7, 2022

(30) Foreign Application Priority Data

Oct. 20, 2020 (CN) .......................... 202011122116.4

(51) Int. Cl.
*H04L 9/40* (2022.01)
*G06N 3/08* (2006.01)
*H04L 67/12* (2022.01)

(52) U.S. Cl.
CPC .......... *H04L 63/1425* (2013.01); *G06N 3/08* (2013.01); *H04L 67/12* (2013.01)

(58) Field of Classification Search
CPC ........ H04L 63/1425; H04L 67/12; G06N 3/08
See application file for complete search history.

(56) References Cited

U.S. PATENT DOCUMENTS

| | | | |
|---|---|---|---|
| 10,333,962 B1* | 6/2019 | Brandwine | H04L 63/1425 |
| 11,125,202 B1* | 9/2021 | Xu | F02P 5/045 |
| 2017/0272458 A1* | 9/2017 | Muddu | H04L 63/1425 |
| 2019/0191311 A1* | 6/2019 | O'Brien | G01C 21/00 |
| 2020/0110875 A1* | 4/2020 | Streifert | G06F 21/552 |
| 2020/0267171 A1* | 8/2020 | Mozumdar | G06F 13/4282 |
| 2020/0382528 A1* | 12/2020 | Kim | H04L 12/40045 |
| 2021/0291849 A1* | 9/2021 | Meng | H04L 63/1425 |
| 2022/0182402 A1* | 6/2022 | Leslie | G06K 9/6219 |

* cited by examiner

*Primary Examiner* — Beemnet W Dada
(74) *Attorney, Agent, or Firm* — Steven M. War

(57) ABSTRACT

An intrusion detection method and system for Internet of Vehicles based on Spark and combined deep learning are provided. The method includes the following steps: S1: setting up Spark distributed cluster; S2: initializing the Spark distributed cluster, constructing a convolutional neural network (CNN) and long short-term memory (LSTM) combined deep learning algorithm model, initializing parameters, and uploading collected data to a Hadoop distributed file system (HDFS); S3: reading the data from the HDFS for processing, and inputting the data to the CNN-LSTM combined deep learning algorithm model, for recognizing the data; and S4: dividing the data into multiple resilient distributed datasets (RDDs) for batch training with a preset number of iterations.

9 Claims, 5 Drawing Sheets

INTRUSION DETECTION METHOD AND SYSTEM FOR INTERNET OF VEHICLES BASED ON SPARK AND COMBINED DEEP LEARNING

CROSS REFERENCE TO RELATED APPLICATION

This patent application claims the benefit and priority of Chinese Patent Application No. 202011122116.4 filed on Oct. 20, 2020, the disclosure of which is incorporated by reference herein in its entirety as part of the present application.

TECHNICAL FIELD

The present disclosure relates to the technical field of intrusion detection on Internet of Vehicles, and in particular, to an intrusion detection method and system for Internet of Vehicles based on Spark and combined deep learning.

BACKGROUND ART

In recent years, with the practical application of emerging technologies in the field of Internet of Vehicles, the Internet of Vehicles has developed rapidly, vehicle to vehicle, vehicle to road, vehicle to person and vehicle to cloud communications can be closer. The communication security of the Internet of Vehicles may play a crucial role in promoting the development of intelligent transportation and smart city. With the improvement of the communication capability, a large amount of network traffic follows. However, the limited computing ability, complex application environment, and distributed nodes and sensor networks in the Internet of Vehicles may lead to prominent security problems of the Internet of Vehicles. How to ensure the safety of the Internet of Vehicles, and speed up the application of the Internet of Vehicles has become a topic widely discussed among automobile manufacturers and researchers. Therefore, using Intrusion Detection (ID) technology to ensure the communication security of the Internet of Vehicles and identify various malicious attacks has become an important means to guarantee the security of the Internet of Vehicles.

For the problem of intrusion detection, scholars at home and abroad have proposed a variety of effective methods, including a machine learning support vector machine (SVM) algorithm, a deep neural network (DNN) model, a multi-layer perception (MLP) algorithm model, etc., which are used to solve the conventional intrusion detection problems. For example, Anish Halima et al. applied the SVM method to an intrusion detection system (IDS). They adopted machine learning algorithms SVM and Naive Bayes, and carried out normalization and feature reduction for analysis and comparison. The mechanism of intrusion detection based on machine learning may need plenty of training time to process a large data set of previous data flows of the network. In a network environment with big data needing to be processed, especially in complex Internet of Vehicles, detection time is extremely important. R. Vinayakumar et al. proposed a hybrid DNN model to detect and classify unknown network attacks. DING Hongwei et al. proposed an intrusion detection method based on a deep convolutional neural network to convert network data into images and reduce dimensions. The accuracy of detection, a false alarm rate and a detection rate can be improved by training and recognition.

However, such algorithms as described above cannot be directly applied in the actual environment of the Internet of Vehicles for the following three reasons. First, the Internet of Vehicles has a complex structure, which involves not only communication within a vehicle but also interaction of the vehicle with persons, other vehicles, roads and clouds. Second, numerous network communication protocols and approaches are used, including Bluetooth, WiFi, wired, mobile cellular networks, and long term evolution-vehicle to everything (LTE-V2X). Third, the network topology changes rapidly. Since vehicles are moving fast, the network topology of the Internet of Vehicles is also constantly changing according to the actual environment.

In view of the above-mentioned problems and the actual characteristics of the Internet of Vehicles, it is desirable to provide a novel intrusion detection solution for using in the Internet of Vehicles to solve the problems of difficulty in fast and effective detection due to huge network traffic during communication in the Internet of Vehicles, and the problem about the accuracy of intrusion detection.

SUMMARY

1. An Object of the Present Disclosure

The present disclosure provides an intrusion detection method and system for Internet of Vehicles based on Spark and combined deep learning to improve the accuracy of the intrusion detection for the Internet of Vehicles with respect to reduce time and solve the communication network security problem in the application of the Internet of Vehicles.

2. Technical Solutions of the Present Disclosure

The present disclosure provides an intrusion detection method for Internet of Vehicles based on Spark and combined deep learning, including the following steps.

S1: setting up a Spark distributed cluster;

S2: initializing the Spark distributed cluster, constructing a convolutional neural network (CNN) and long short-memory (LSTM) combined deep learning algorithm model, initializing parameters, and uploading collected data to Hadoop distributed file system (HDFS);

where the constructing the CNN-LSTM combined deep learning algorithm model in step S2 specifically includes the following steps.

S2.3.1: iterating the data for 100 times when training;

S2.3.2: extracting the features of the data of the Internet of Vehicles by using the CNN, where the first layer of the CNN is an input layer of the CNN, and this layer of the CNN has 11*11 input dimensions;

S2.3.3: using a second layer as a convolutional layer to extract the features, where the convolutional layer using a sigmoid or tanh function to increase rates of convergence and training, where the convolution kernel of this layer has a size of [5*5];

each convolutional layer includes two processes of convolution operation and nonlinear activation; and a feature map of the current layer can be obtained by a convolution kernel performing the convolution operation on an output feature map of a previous layer or an original feature map:

$$X_j^l = \Sigma_i X_i^{l-1} \otimes K_{ij}^{l-1} + b_j^l \qquad (2)$$

where $X_j^l$ represents an input of a j-th position in a feature map of a l-th layer after convolution, while $X_i^{l-1}$ represents an i-th input matrix in a (l−1)-th layer, represents a convolution kernel connecting the i-th input matrix and the j-th position between the l-th layer and the (l−1)-th layer, and $b_j^l$ represents a first offset from the j-th position in the feature map of the l-th layer.

S2.3.4: sampling the features by pooling layers, with LeakyRelu for activation:

$$f(x)=\max(0,x) \quad (3)$$

where when a value of a standardized feature x of the Internet of Vehicles is less than 0, a value of $f(x)$ is 0; and when the value of the standardized feature x of the Internet of Vehicles is greater than 0, the value of $f(x)$ is x;

S2.3.5: connecting the extracted features by a fully connected layer to form an overall feature, and inputting the overall feature to the LSTM, where an output of a neuron of the fully connected layer is calculated:

$$y_j^l = \Sigma_i w_{ij}^l * x_i^{l-1} + b_j^l \quad (4)$$

where $y_j^l$ represents the calculated output result of a j-th neuron among neurons in a l-th fully connected layer, while $w_{ij}^l$ represents a connection weight for a i-th feature in the feature map of the (l−1)-th layer and a j-th neuron in the l-th layer, represents a second value of the i-th feature in the feature map of the (l−1)-th layer, and represents a second offset of the j-th neuron among neurons in a l-th fully connected layer;

S2.3.6: controlling feedback by using a group of gate functions in the LSTM, such that short-term errors are deleted and continuous characteristics are retained; using p(t), g(t), $f$(t) and q(t) in the LSTM for outputting, where p(t) is an input gate, which is a number of the feature values of the data of the Internet of Vehicles; g(t) is an update gate, which is a number of layers of the recurrent neural network and defaults to 1; $f$(t) is a forget gate, which is a dimension of the input matrix calculated with a first weight, a third offset and the input gate; q(t) is an output gate, which is a result calculated with a vector formed by matrix joining a second weight, a forth offset, the forget gate and the update gate; and previously learned feedback s(t) and current output h(t) are determined through two types of control gates σ and tan h:

$$s(t)=\sigma(f(t))*s(t-1)+\sigma(p(t))*\tanh g(t) \quad (5)$$

$$h_t=\tanh s(t)*\sigma(q(t)) \quad (6)$$

learning by the LSTM an input by adjusting weights and value of σ in the LSTM and thus effectively generating a time feature among input data in an output;

S3: reading the data from the HDFS for processing, and inputting the data to the CNN-LSTM combined deep learning algorithm model for recognizing the data; and S4: dividing the data into multiple resilient distributed datasets (RDDs) for batch training with a preset number of iterations.

In the step S1: the Spark distributed cluster includes one master node and four slave nodes, and involves a resilient distributed dataset (RDD), a HDFS and a fault-tolerant mechanism.

The constructing a CNN-LSTM combined deep learning algorithm model, initializing parameters and uploading the collected data to HDFS in the step S2 specifically includes the following steps.

S2.1.1: collecting data, which mainly refers to interactive data generated during communication in the Internet of Vehicles, including normal interactive data, and entertainment information and services, maps, road conditions and driver assistance which are obtained by an on-board terminal from a cloud service platform;

S2.1.2: obtaining, by the on-board terminal, traffic light information and road condition and blind spot information from a road side unit;

S2.1.3: transmitting, by the on-board terminal, information including early warning information about road conditions, to another on-board terminal;

S2.1.4: uploading, by the road side unit, sensed road data or high-complexity calculation to the cloud service platform, where the sensed road data and high-complexity calculation includes types of collection protocols, network connection states and types of network services;

S2.1.5: obtaining abnormal intrusion data during data transmission; and

S2.1.6: connecting an intrusion detecting device to a transmission node to collect, deduplicate and analyze the data.

The step S2.1.4 specifically includes collecting, protocols that includes transmission control protocol (TCP), user datagram protocol (UDP), and Internet control message protocol (ICMP); network connection states that includes OTH, REJ and RSTO; and network services that includes auth, bgp, http, ftp, and telnet.

In the step S2.1.5: the abnormal intrusion data includes denial-of-service (DoS), Probing, remote-to-login (R2L), and user-to-root (U2R), and specific classifying labels include back, land, neptune, pod, ipsweep and nmap.

In the step S2, when uploading the collected data to HDFS, to preprocess unprocessed communication data through digitization, normalization and standardization, which are specifically as follows.

S2.2.1: preprocessing the unprocessed data, specifically including: during interaction between an on-board unit (OBU) and a road side unit (RSU) that transmit and receive messages of a vehicle, detecting and processing the data transmitted; cleaning wrong data and removing incomplete data; and digitizing non-numerical data into valuable new data;

S2.2.2, digitizing the non-numerical data present in various forms during data transmission, where specifically, the data collected in step S2.2.1 is converted from original character data into numerical data to facilitate analysis and recognition of data content; for example, attribute features of three types of protocols TCP, UDP and ICMP are coded as 1, 2, and 3;

S2.2.3: converting numeral values of the data of the Internet of Vehicles into decimals within a range (0, 1) or (1, 1) from a range [0, 58329] based on the numeral data, thereby facilitating rapid extraction of the data and eliminating an effect of different dimensions caused by digitalization; and by zero-mean normalization, normalizing the data with mean and standard deviation of the data, where the data of the Internet of Vehicles after the normalization complies with the standard normal distribution with the mean of 0 and the standard deviation of 1; and function is shown below:

$$X^* = \frac{X - \mu}{\sigma} \quad (1)$$

where, μ is a mean of the current data collected in the Internet of Vehicles, and σ is a standard deviation of the current data collected in the Internet of Vehicles; and S2.2.4: performing standardized analysis of the data of the Internet of Vehicles after the data collection and the data preprocessing.

The present disclosure provides an intrusion detection system for Internet of Vehicles based on Spark and combined deep learning, including a memory that stores a computer program, and a processor, where the processor implements the steps of the method according to any one of the above-mentioned embodiments when executing the computer program.

The present disclosure provides a computer readable storage medium. The computer readable storage medium stores a computer program, and the computer program is executed by a processor to implement the steps of the control method of the sense amplifier according to any one of the above-mentioned embodiments.

3. Advantages of the Present Disclosure (1) The present disclosure uses a combined deep learning algorithm for the detection results of intrusion detection on the Internet of Vehicles to improve the accuracy of intrusion detection on the Internet of Vehicles. The combined algorithm used is simple to calculate and easy to implement, and has a practical application value.

(2) The present disclosure reduces the actual detection time for intrusion detection by setting up Spark distributed clusters, and has good real-time performance.

(3) The present disclosure can accurately capture the abnormal data in the data communication process of the Internet of Vehicles and complete the detection as fast as possible to obtain the detection results.

(4) The present disclosure can be used in all parts of the system structure of the Internet of Vehicles, and the used detection algorithm can also be replaced. Thus, good mobility and scalability are achieved in the present disclosure.

DETAILED DESCRIPTION OF THE EMBODIMENTS

The technical solutions in examples of the present disclosure will be clearly and completely described below with reference to the accompanying drawings used therein. Apparently, the described embodiments are merely a part rather than all of the embodiments of the present disclosure. All other examples obtained by those skilled in the art based on the examples of the present invention without creative efforts should fall within the protection scope of the present invention.

The examples of the present disclosure will be further described in detail below with reference to the accompanying drawings.

Figure 1:
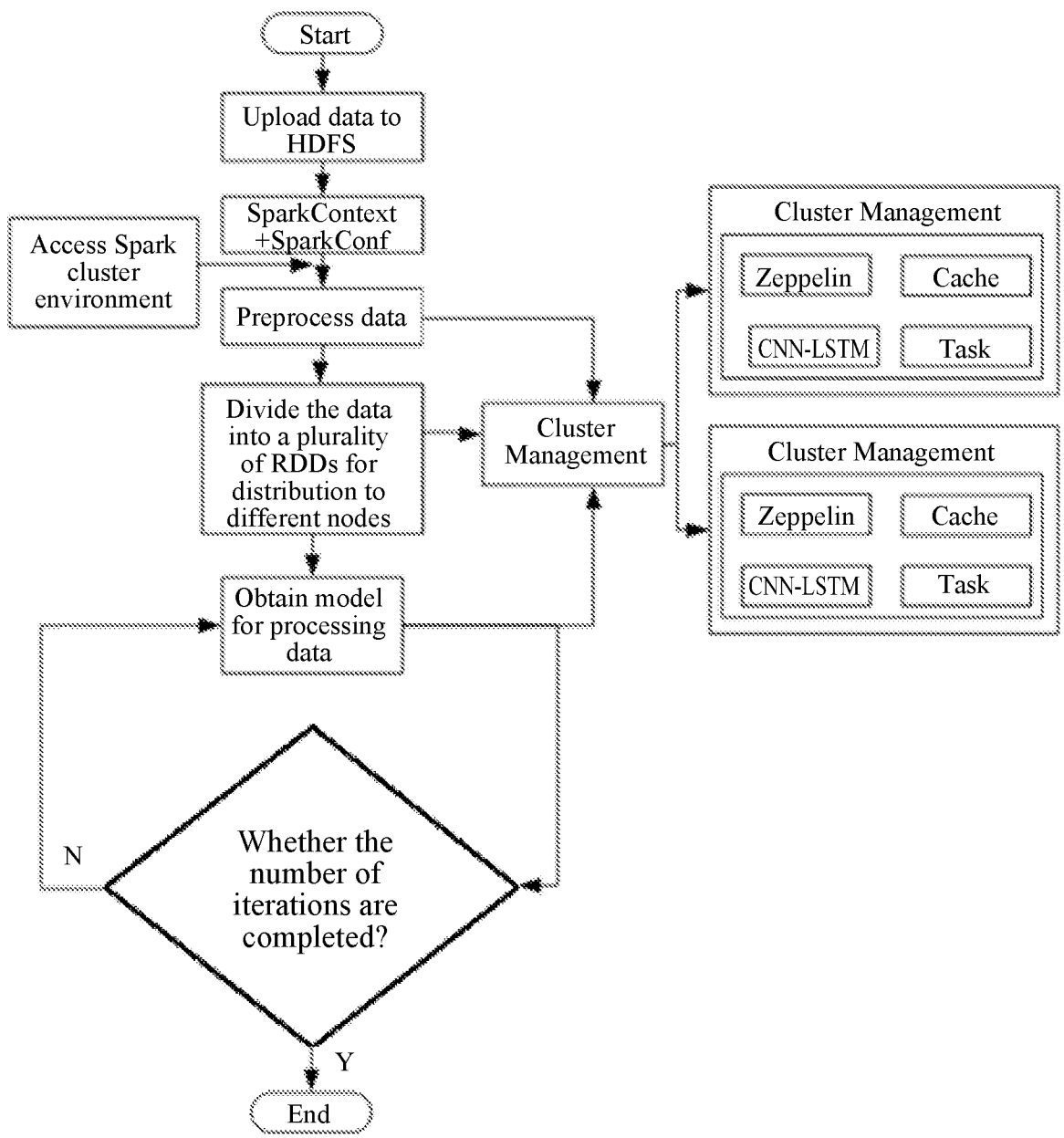
FIG. 1 is a flowchart of a distributed combined deep learning algorithm based on Spark platform for Internet of Vehicles according to the present disclosure.
Figure 2:
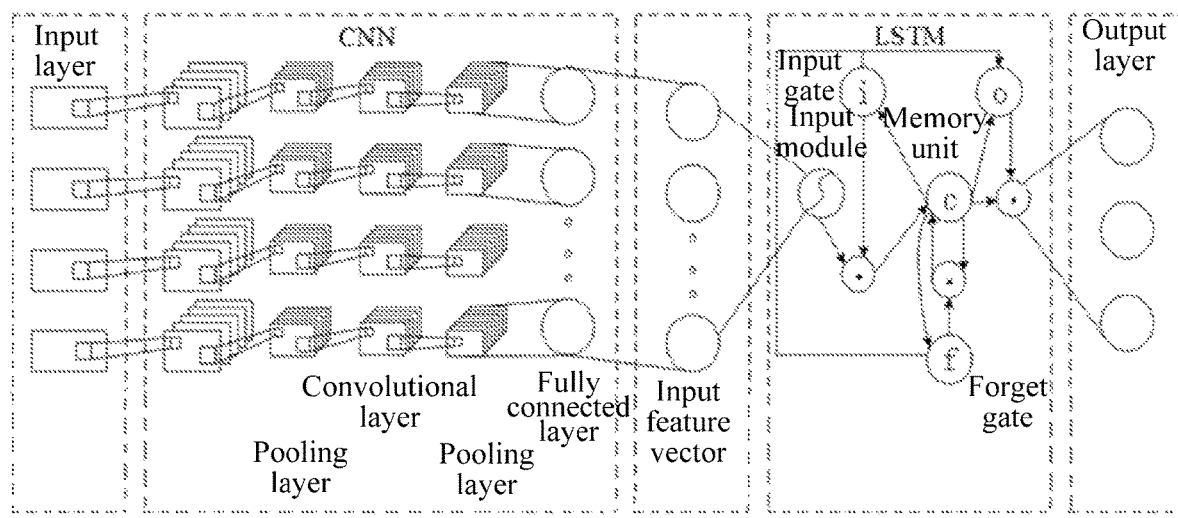
FIG. 2 is a schematic diagram of a combined deep learning algorithm model.
Figure 5:
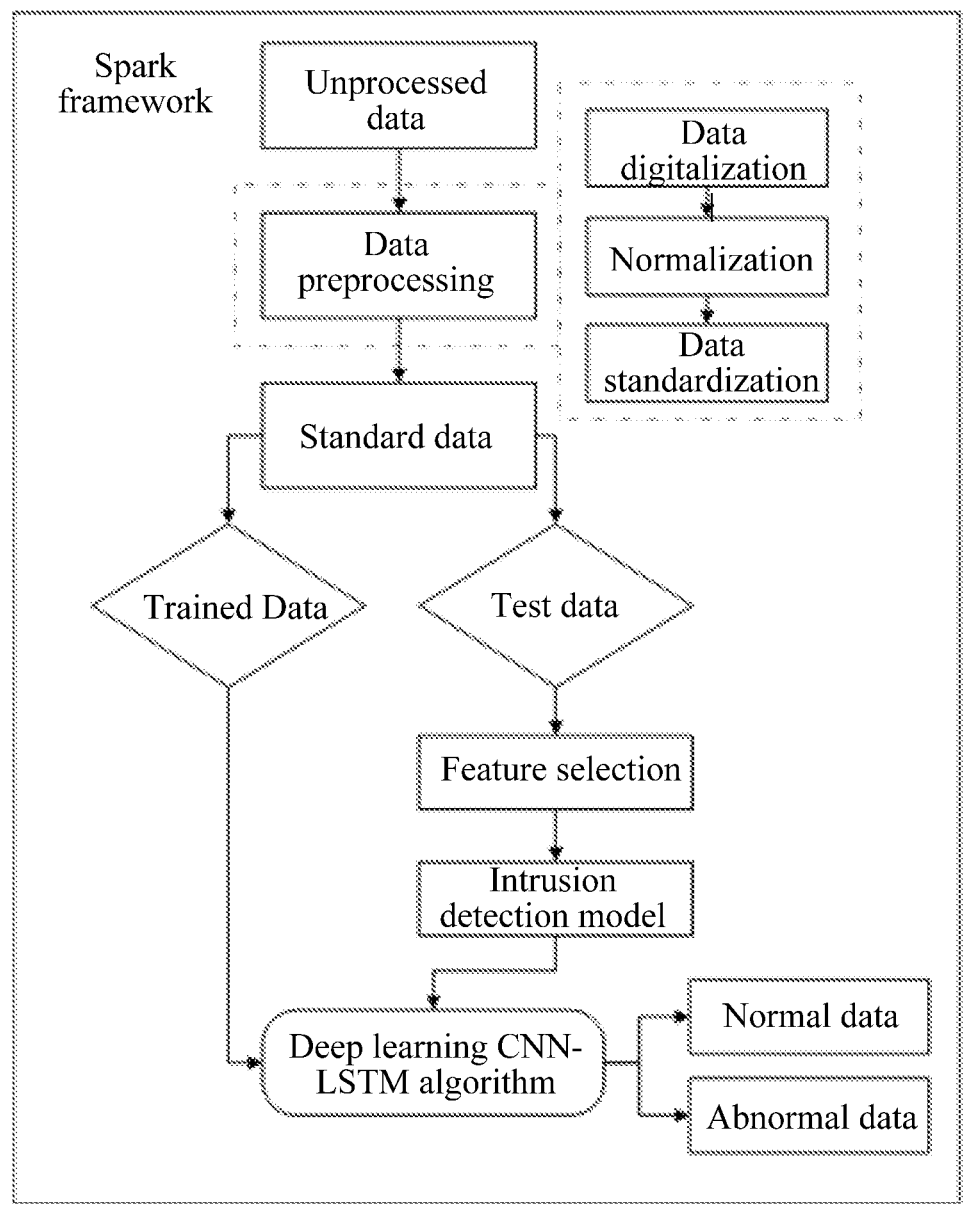
FIG. 5 is a flowchart of an intrusion detection method for Internet of Vehicles based on Spark and combined deep learning according to the present disclosure.

As shown in FIGS. 1 and 5, intrusion detection is performed on the data of the Internet of Vehicles based on Spark distributed cluster and a combined deep learning algorithm model, the process includes the following steps.

In step S1, a Spark distributed cluster is set up to use a combined deep learning method in the following step S2 in intrusion detection on the Internet of Vehicles. The Spark distributed cluster includes one master node and four slave nodes. The Spark architecture mainly involves modules such as a resilient distributed dataset (RDD), a Hadoop distributed file system (HDFS) and a fault-tolerant mechanism.

In step S2, the Spark distributed cluster is initialized, and a CNN-LSTM combined deep learning algorithm model is constructed, with parameters being initialized. In addition, collected data are uploaded to HDFS.

In step S3, the data is read from the HDFS for processing and then input to the CNN-LSTM combined deep learning algorithm model to be recognized.

In step S4, the data is divided into multiple RDDs for batch training to a predetermined number of iterations.

In step S2.1 of the step S2, original data transmitted during communication in the Internet of Vehicles is collected, which includes the following steps.

In step S2.1.1, data is collected, which mainly refers to interactive data generated during communication in the Internet of Vehicles, including normal interactive data, and entertainment information and services, maps, road conditions, and driver assistance and the like that are obtained by an on-board terminal from a cloud service platform.

In step S2.1.2, the on-board terminal obtains traffic light information, road condition and blind spot information from a road side unit.

In step S2.1.3, the on-board terminal transmits information including early warning information about road conditions to another on-board terminal.

In step S2.1.4, the road side unit uploads sensed road data or high-complexity calculation to the cloud service platform. The total collected data includes 3 types of protocols (transmission control protocol (TCP), user datagram protocol (UDP), and Internet control message protocol (ICMP)), 11 network connection states such as OTH, REJ and RSTO, 70 types of network services, including auth, bgp, http, ftp, telnet, etc.

In step S2.1.5, abnormal intrusion data during data transmission includes denial-of-service (DoS) attack, Probing attack, remote-to-login (R2L) attack, user-to-root (U2R) attack, etc., and are divided into total 39 attack types in 4 categories that are identified with specific labels such as back, land, neptune, pod, ipsweep and nmap.

In step S2.1.6, the data during communication in the Internet of Vehicles is collected. Specifically, all the interactive data will eventually be aggregated by using a wired mode, such as through a fiber-optic cable, regardless of interaction means. Accordingly, an intrusion detecting device is connected to a transmission node (a switch or a router) to collect, deduplicate and analyze the data.

In step S2.2, the unprocessed communication data is preprocessed by the steps of digitization, normalization and standardization.

In step S2.2.1, the unprocessed communication data is preprocessed. Specifically, during interaction between an on-board unit (OBU) and a road side unit (RSU) that transmit and receive messages of a vehicle, the data transmitted are detected and processed, so that wrong data is cleansed and incomplete data is removed, and the non-numerical data is digitized into valuable new data.

In step S2.2.2, the data present in various forms during data transmission is digitized. Specifically, the data collected in step S2.2.1 is converted from original character data into numerical data to facilitate analysis and recognition of data content. For example, the attribute features of the three types of protocols TCP, UDP and ICMP are coded as 1, 2, and 3.

In step S2.2.3, the values of data of the Internet of Vehicles are converted into decimals within a range (0, 1) or (1, 1) from the range [0, 58329] according to the digitized data, thereby facilitating rapid extraction of the data. The effect of different dimensions caused by digitalization is eliminated. By zero-mean normalization, the data is normalized with the mean and standard deviation of the data. The processed data of the Internet of Vehicles complies with the standard normal distribution with the mean of 0 and the standard deviation of 1. The function prototype is shown below:

$$X^* = \frac{X - \mu}{\sigma} \quad (1)$$

where $\mu$ is the mean of the current data collected in the Internet of Vehicles, and $\sigma$ is the standard deviation of the current data collected in the Internet of Vehicles.

In step S2.2.4, standardized analysis of the data of the Internet of Vehicles is performed according to the data collection and the data preprocessing.

In step S2.3, data training and feature extraction are performed based on the CNN-LSTM combined deep learning algorithm model to detect the data.

In step S2.3.1, the data is iterated for 100 times when the model is trained.

In step S2.3.2, the features of the data of the Internet of Vehicles are extracted by using CNN, where the first layer of the CNN structure is an input layer of the network, and has 11*11 input dimensions.

In step S2.3.3, the second layer is a convolutional layer for extracting the features, and sigmoid or tanh function is used to increase the rates of convergence and training, where the convolution kernel of this layer has a size of [5*5].

Each convolutional layer includes two processes of convolution operation and nonlinear activation. Through the convolution kernel, the feature map of the current layer can be obtained by performing the convolution operation on the output feature map of the previous layer or the original feature map:

$$X_j^l = \Sigma_i X_i^{l-1} \otimes K_{ij}^{l-1} + b_j^l \quad (2)$$

where $X_j^l$ represents an input of the j-th position in the feature map of the l-th layer after convolution, while $X_i^{l-1}$ represents the i-th input matrix in the (l−1)-th layer, $K_{ij}^{l-1}$ represents the convolution kernel connecting the i-th input matrix and the j-th position between the l-th layer and the (l−1)-th layer, and $b_j^l$ represents an offset of the j-th position of the feature map of the l-th layer.

In step S2.3.4, the features are sampled by pooling layers, with the LeakyRelu for activation:

$$f(x) = \max(0, x) \quad (3)$$

where when the value x of the Internet of Vehicles after standardizing is less than 0, the value of $f(x)$ is 0; and when the value x of the Internet of Vehicles after standardizing is greater than 0, the value of $f(x)$ is x.

In step S2.3.5, the extracted features are connected by a fully connected layer to form an overall feature, and the overall feature is input to the LSTM, the output from a neuron of the fully connected layer is calculated as follows:

$$y_j^l = \Sigma_i w_{ij}^l * x_i^{l-1} + b_j^l \quad (4)$$

where $y_j^l$ represents an output result of the j-th neuron among neurons in the l-th fully connected layer after calculating, while $w_{ij}^l$ represents a connection weight between the i-th feature in the feature map of the (l−1)-th layer and the j-th neuron in the l-th layer, represents a value of the i-th feature in the feature map of the (l−1)-th layer, and represents an offset of the j-th neuron among neurons in l-th fully connected layer.

In step S2.3.6, the LSTM network uses a group of gate functions to control feedback, so that short-term errors are deleted and continuous characteristics are retained. p(t), g(t), f(t) and q(t) in the LSTM are used for outputting, where p(t) is an input gate, which represents the number of the feature values of the data of the Internet of Vehicles; g(t) is an update gate, which represents the number of layers of the LSTM network and defaults to 1; f(t) is a forget gate, which represents dimensions of the input matrix calculated with the weight, the offset and the input gate; q(t) is an output gate, which is a result calculated with a vector formed by matrix joining the weight, the offset, the forget gate and the update gate; and finally previously learned feedback s(t) and current output h(t) are determined through two types of control gates $\sigma$ and tan h:

$$s(t) = \sigma(f(t)) * s(t-1) + \sigma(p(t)) * \tanh g(t) \quad (5)$$

$$h_t = \tanh s(t) * \sigma(q(t)) \quad (6)$$

The LSTM learns an input by adjusting the weight and the value of $\sigma$ in the network and thus effectively generates a time feature between input data in the output.

Figure 3:
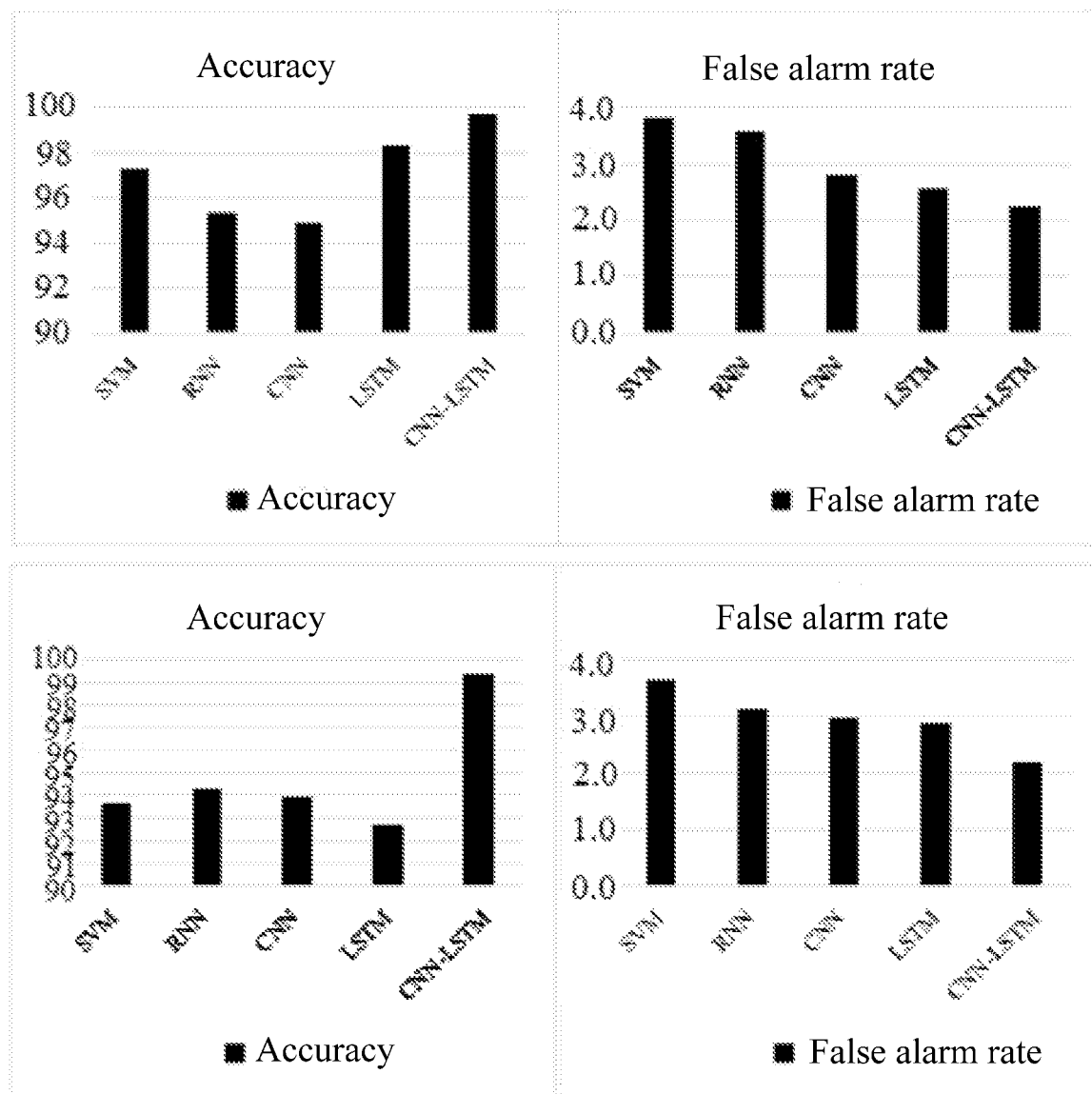
FIG. 3 is a comparison diagram of accuracy and false alarm rate among the present disclosure and some existing methods.

3. To verify that the method of the present disclosure has a better effect than the prior art, relevant datasets are used to perform comparison and verification on methods. FIG. 3 shows the comparison results of the present disclosure and some existing methods on NSL-KDD datasets. A total of 148517 pieces of data are used in the upper figures of FIG. 3, and a total of 121981 pieces of data are used for comparison on UNSW-NB15 datasets in the figures below. By comparing four different methods with the method of the present disclosure, the accuracy rates of the combined deep learning algorithm model has reached 99.7% and 99.4%, respectively.

Figure 4:
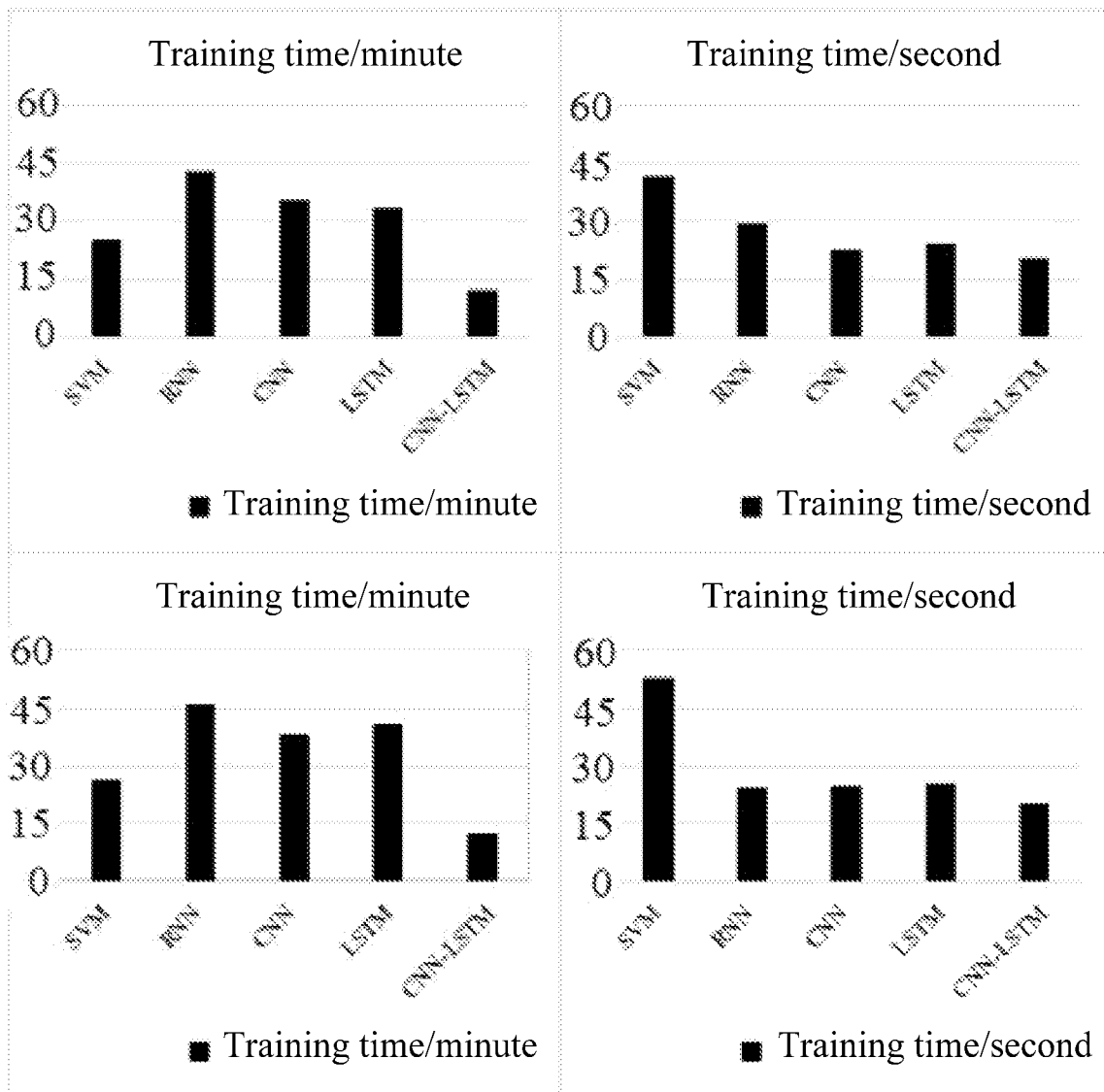
FIG. 4 is a comparison diagram of detection time among the present disclosure and some existing methods.

4. To verify that the method of the present disclosure is shorter in detection time than the prior art, Spark distributed cluster and relevant datasets are used to perform comparison and verification on the combined deep learning algorithm model. FIG. 4 shows the comparison results of the present disclosure and some existing methods on NSL-KDD and UNSW NB15 datasets. It can be seen that the distributed combined deep learning method based on Spark has shortest detection time.

The foregoing are merely descriptions of preferred specific embodiments of the present disclosure, and the protection scope of the present disclosure is not limited thereto. Any modification or replacement easily conceived by those skilled in the art within the technical scope of the present disclosure shall fall within the protection scope of the present disclosure. Therefore, the protection scope of the present disclosure should be subject to the protection scope defined by the claims.

What is claimed is:

1. An intrusion detection method for Internet of Vehicles based on Spark and combined deep learning, comprising following steps:
   S1: setting up a Spark distributed cluster;
   wherein the Spark distributed cluster comprises one master node and plurality of slave nodes, and involves a resilient distributed dataset (RDD), a Hadoop distributed file system (HDFS) and a fault-tolerant mechanism;

S2: initializing the Spark distributed cluster, constructing a convolutional neural network (CNN) and long short-memory (LSTM) combined deep learning algorithm model, initializing parameters of the model, and uploading collected data to the HDFS;

wherein constructing the CNN-LSTM combined deep learning algorithm model, initializing parameters of the model and uploading collected data into the HDFS in step S2 comprises:

S2.1.1: collecting data, which mainly refers to interactive data generated during communication in the Internet of Vehicles, comprising normal interactive data, and entertainment information and services, maps, road conditions and driver assistance that are obtained by an on-board terminal from a cloud service platform;

S2.1.2: obtaining, by the on-board terminal, traffic light information, road condition and blind spot information from a road side unit;

S2.1.3: transmitting, by the on-board terminal, information comprising early warning information about road conditions to another on-board terminal;

S2.1.4: uploading, by the road side unit, sensed road data or calculation to the cloud service platform, wherein the sensed road data or calculation comprising collected protocol type, network connection state and network service types;

S2.1.5: obtaining abnormal intrusion data during data transmission; and

S2.1.6: connecting an intrusion detecting device to a transmission node to perform collection, deduplication and analysis on the data;

wherein uploading the collected data to the HDFS for preprocessing unprocessed communication data by data digitization, normalization and standardization:

S2.2.1: preprocessing the unprocessed communication data, comprising: during interaction between an on-board unit (OBU) and a road side unit (RSU) that transmit and receive messages of a vehicle, detecting and processing the data transmitted such that wrong data is cleansed and incomplete data is removed, and the non-numerical data is digitized into valuable new data;

S2.2.2: digitizing the data present in various forms during data transmission, wherein, the data collected in step S2.2.1 is converted from original character data into numerical data to facilitate analysis and recognition of data content for example, attribute features of three types of protocols TCP, UDP and ICMP are coded as 1, 2, and 3;

S2.2.3: converting numeral values of data of the Internet of Vehicles into decimals within a range (0, 1) or (1, 1) from a range [0, 58329] according to the numeral data, thereby facilitating rapid extraction of the data and eliminating an effect of different dimensions caused by digitalization; and by zero-mean normalization, normalizing the data with mean and standard deviation of the data, wherein the data of the Internet of Vehicles after the normalization complies with standard normal distribution with a mean of 0 and a standard deviation of 1; and a function is shown below:

$$X^* = \frac{X - \mu}{\sigma} \tag{1}$$

wherein $\mu$ is a mean of current data collected in the Internet of Vehicles, and $\sigma$ is a standard deviation of the current data;

S2.2.4: performing standardized analysis of the data of the Internet of Vehicles through data collection and data preprocessing;

S2.3.1: iterating data for plurality of times when training;

S2.3.2: extracting features of the data of the Internet of Vehicles by using the CNN, wherein a first layer of the CNN is an input layer of the CNN;

S2.3.3: using a second layer as a convolutional layer to extract the features, and the convolutional layer using a sigmoid or tanh function to increase rates of convergence and training, wherein each convolutional layer comprises two processes of convolution operation and nonlinear activation; and the feature map of the current layer is obtained through the convolution kernel by performing convolution operation on output feature map of a previous layer or an original feature map:

$$X_j^l = \Sigma_i X_i^{l-1} \otimes K_{ij}^{l-1} + b_j^l \tag{2}$$

where $X_j^l$ represents an input of a j-th position in the feature map of a l-th layer after convolution, while $X_i^{l-1}$ represents an i-th input matrix in a (l−1)-th layer, $K_{ij}^{l-1}$ represents a convolution kernel connecting the i-th input matrix and the j-th position between the l-th layer and the (l−1)-th layer, and $b_j^l$ represents an offset from the j-th position the feature map of the l-th layer;

S2.3.4: sampling the features by pooling layers, with LeakyRelu for activation:

$$f(x) = \max(0, x) \tag{3}$$

wherein a value of a standardized feature x of the Internet of Vehicles is less than 0, a value of $f(x)$ is 0; and when the value of the standardized feature x of the Internet of Vehicles is greater than 0, the value of $f(x)$ is x;

S2.3.5: connecting the extracted features by a fully connected layer to form an overall feature, and inputting the overall feature to the LSTM, wherein an output of a neuron of the fully connected layer is calculated:

$$y_j^l = \Sigma_i w_{ij}^l * x_i^{l-1} + b_j^l \tag{4}$$

wherein $y_j^l$ represents the calculated output result of a j-th neuron among neurons in a l-th fully connected layer, while $w_{ij}^l$ represents a connection weight for a i-th feature in the feature map of the (l−1)-th layer and a j-th neuron in the l-th layer, $x_i^{l-1}$ represents a value of the i-th feature in the feature map of the (l−1)-th layer, and $b_j^l$ represents an offset of the j-th neuron among neurons in a l-th fully connected layer;

S2.3.6: controlling feedback by using a group of gate functions of the LSTM network, such that short-term errors are deleted and continuous characteristics are retained; using p(t), g(t), f(t) and q(t) in the LSTM for outputting, where p(t) is an input gate, which is a number of the feature values of the data of the Internet of Vehicles; g(t) is an update gate, which is a number of layers of the LSTM network and defaults to 1; f(t) is a forget gate, which is a dimension of the input matrix calculated with a weight, a offset and the input gate; q(t) is an output gate, which is a result calculated with a vector formed by matrix joining a weight, a offset, the forget gate and the update gate; and previously learned feedback s(t) and current output h(t) are determined through two types of control gates σ and tan h:

$$s(t)=\sigma(f(t))*s(t-1)+\sigma(p(t))*\tanh g(t) \quad (5)$$

$$h_t=\tanh s(t)*\sigma(q(t)) \quad (6)$$

learning, by the LSTM, an input by adjusting weights and a value of σ in the LSTM and thus effectively generating a time feature among input data in an output;

S3: reading the data from the HDFS for processing and inputting the data to the CNN-LSTM combined deep learning algorithm model for recognizing the data; and S4: dividing the data into a plurality of RDDs for batch training with a preset number of iterations.

2. The intrusion detection method for Internet of Vehicles based on Spark and combined deep learning according to claim 1, wherein the step S2.1.4 comprises collecting protocols that comprises transmission control protocol (TCP), user datagram protocol (UDP), and Internet control message protocol (ICMP); network connection states that comprises optical transmission hierarchy (OTH), REJ and RSTO; and network services that comprises auth, bgp, http, ftp, and telent.

3. The intrusion detection method for Internet of Vehicles based on Spark and combined deep learning according to claim 1, wherein in the step S2.1.5, the abnormal intrusion data comprises denial-of-service (DoS), Probing, remote-to-login (R2L), and user-to-root (U2R), and specific classifying labels comprise back, land, neptune, pod, ipsweep and nmap.

4. An intrusion detection system for Internet of Vehicles based on Spark and combined deep learning, comprising a memory that stores a computer program, and a processor, wherein the processor implements a method comprising following steps:

S1: setting up a Spark distributed cluster;

wherein the Spark distributed cluster comprises one master node and plurality of slave nodes, and involves a RDD, a HDFS and a fault-tolerant mechanism;

S2: initializing the Spark distributed cluster, constructing a CNN and LSTM combined deep learning algorithm model, initializing parameters of the model, and uploading collected data to the HDFS;

wherein constructing the CNN-LSTM combined deep learning algorithm model, initializing parameters of the model and uploading collected data into the HDFS in step S2 comprises:

S2.1.1: collecting data, which mainly refers to interactive data generated during communication in the Internet of Vehicles, comprising normal interactive data, and entertainment information and services, maps, road conditions and driver assistance that are obtained by an on-board terminal from a cloud service platform;

S2.1.2: obtaining, by the on-board terminal, traffic light information, road condition and blind spot information from a road side unit S2.1.3: transmitting, by the on-board terminal, information comprising early warning information about road conditions to another on-board terminal;

S2.1.4: uploading, by the road side unit, sensed road data or calculation to the cloud service platform, wherein the sensed road data or calculation comprising collected protocol type, network connection state and network service types;

S2.1.5: obtaining abnormal intrusion data during data transmission; and

S2.1.6: connecting an intrusion detecting device to a transmission node to perform collection, deduplication and analysis on the data;

wherein uploading the collected data to the HDFS for preprocessing unprocessed communication data by data digitization, normalization and standardization:

S2.2.1: preprocessing the unprocessed communication data, comprising: during interaction between an OBU and a RSU that transmit and receive messages of a vehicle, detecting and processing the data transmitted such that wrong data is cleansed and incomplete data is removed, and the non-numerical data is digitized into valuable new data;

S2.2.2: digitizing the data present in various forms during data transmission, wherein, the data collected in step S2.2.1 is converted from original character data into numerical data to facilitate analysis and recognition of data content for example, attribute features of three types of protocols TCP, UDP and ICMP are coded as 1, 2, and 3;

S2.2.3: converting numeral values of data of the Internet of Vehicles into decimals within a range (0, 1) or (1, 1) from a range [0, 58329] according to the numeral data, thereby facilitating rapid extraction of the data and eliminating an effect of different dimensions caused by digitalization; and by zero-mean normalization, normalizing the data with mean and standard deviation of the data, wherein the data of the Internet of Vehicles after the normalization complies with standard normal distribution with a mean of 0 and a standard deviation of 1; and a function is shown below:

$$X^* = \frac{X - \mu}{\sigma} \quad (1)$$

wherein $\mu$ is a mean of current data collected in the Internet of Vehicles, and $\sigma$ is a standard deviation of the current data;

S2.2.4: performing standardized analysis of the data of the Internet of Vehicles through data collection and data preprocessing;

S2.3.1: iterating data for plurality of times when training;

S2.3.2: extracting features of the data of the Internet of Vehicles by using the CNN, wherein a first layer of the CNN is an input layer of the CNN;

S2.3.3: using a second layer as a convolutional layer to extract the features, and the convolutional layer using a sigmoid or tanh function to increase rates of convergence and training, wherein each convolutional layer comprises two processes of convolution operation and nonlinear activation; and the feature map of the current layer is obtained through the convolution kernel by performing convolution operation on output feature map of a previous layer or an original feature map:

$$X_j^l = \Sigma_i X_i^{l-1} \otimes K_{ij}^{l-1} + b_j^l \quad (2)$$

wherein $X_j^l$ represents an input of a j-th position in a feature map of a l-th layer after convolution, while $X_i^{l-1}$ represents an i-th input matrix in a (l−1)-th layer, $K_{ij}^{l-1}$ represents a convolution kernel connecting the i-th input matrix and the j-th position between the l-th layer and the (l−1)-th layer, and $b_j^l$ represents a first offset from the j-th position in the feature map of the l-th layer;

S2.3.4: sampling the features by pooling layers, with LeakyRelu for activation:

$$f(x)=\max(0,x) \quad (3)$$

wherein when a value of a standardized feature x of the Internet of Vehicles is less than 0, a value of $f(x)$ is 0; and when the value of the standardized feature x of the Internet of Vehicles is greater than 0, the value of $f(x)$ is x;

S2.3.5: connecting the extracted features by a fully connected layer to form an overall feature, and inputting the overall feature to the LSTM, wherein an output of a neuron of the fully connected layer is calculated:

$$y_j^l = \Sigma_i w_{ij}^l * x_i^{l-1} + b_j^l \quad (4)$$

wherein $y_j^l$ represents the calculated output result of a j-th neuron among neurons in a l-th fully connected layer, while $w_{ij}^l$ represents a connection weight for a i-th feature in the feature map of the (l–1)-th layer and a j-th neuron in the l-th layer, $x_i^l$ represents a value of the i-th feature in the feature map of the (l-1)-th layer, and $b_j^l$ represents an offset of the j-th neuron among neurons in the l-th fully connected layer, S2.3.6: controlling feedback by using a group of gate functions in the LSTM network, such that short-term errors are deleted and continuous characteristics are retained; using p(t), g(t), $f(t)$ and q(t) in the LSTM for outputting, where p(t) is an input gate, which is a number of the feature values of the data of the Internet of Vehicles; g(t) is an update gate, which is a number of layers of the recurrent neural network and defaults to 1; $f(t)$ is a forget gate, which is a dimension of the input matrix calculated with a first weight, a third offset and the input gate; q(t) is an output gate, which is a result calculated with a vector formed by matrix joining a second weight, a forth offset, the forget gate and the update gate; and previously learned feedback s(t) and current output h(t) are determined through two types of control gates σ and tan h:

$$s(t) = \sigma(f(t)) * s(t-1) + \sigma(p(t)) * \tanh g(t) \quad (5)$$

$$h_t = \tanh s(t) * \sigma(q(t)) \quad (6)$$

learning, by the LSTM, an input by adjusting weights and a value of σ in the LSTM and thus effectively generating a time feature among input data in an output;

S3: reading the data from the HDFS for processing and inputting the data to the CNN-LSTM combined deep learning algorithm model for recognizing the data; and S4: dividing the data into a plurality of RDDs for batch training with a preset number of iterations.

5. A non-transitory computer readable storage medium storing a computer program, wherein when the computer program is executed by a processor, a method is implemented, wherein the method comprising following steps:

S1: setting up a Spark distributed cluster;

wherein the Spark distributed cluster comprises one master node and plurality of slave nodes, and involves a RDD, a HDFS and a fault-tolerant mechanism;

S2: initializing the Spark distributed cluster, constructing a CNN and LSTM combined deep learning algorithm model, initializing parameters of the model, and uploading collected data to the HDFS;

wherein constructing the CNN-LSTM combined deep learning algorithm model, initializing parameters of the model and uploading collected data into the HDFS in step S2 comprises:

S2.1.1: collecting data, which mainly refers to interactive data generated during communication in the Internet of Vehicles, comprising normal interactive data, and entertainment information and services, maps, road conditions and driver assistance that are obtained by an on-board terminal from a cloud service platform;

S2.1.2: obtaining, by the on-board terminal, traffic light information, road condition and blind spot information from a road side unit S2.1.3: transmitting, by the on-board terminal, information comprising early warning information about road conditions to another on-board terminal;

S2.1.4: uploading, by the road side unit, sensed road data or calculation to the cloud service platform, wherein the sensed road data or calculation comprising collected protocol type, network connection state and network service types;

S2.1.5: obtaining abnormal intrusion data during data transmission; and

S2.1.6: connecting an intrusion detecting device to a transmission node to perform collection, deduplication and analysis on the data;

wherein uploading the collected data to the HDFS for preprocessing unprocessed communication data by data digitization, normalization and standardization:

S2.2.1: preprocessing the unprocessed communication data, comprising: during interaction between an OBU and a RSU that transmit and receive messages of a vehicle, detecting and processing the data transmitted such that wrong data is cleansed and incomplete data is removed, and the non-numerical data is digitized into valuable new data;

S2.2.2: digitizing the data present in various forms during data transmission, wherein, the data collected in step S2.2.1 is converted from original character data into numerical data to facilitate analysis and recognition of data content for example, attribute features of three types of protocols TCP, UDP and ICMP are coded as 1, 2, and 3;

S2.2.3: converting numeral values of data of the Internet of Vehicles into decimals within a range (0, 1) or (1, 1) from a range [0, 58329] according to the numeral data, thereby facilitating rapid extraction of the data and eliminating an effect of different dimensions caused by digitalization; and by zero-mean normalization, normalizing the data with mean and standard deviation of the data, wherein the data of the Internet of Vehicles after the normalization complies with standard normal distribution with a mean of 0 and a standard deviation of 1; and a function is shown below:

$$X^* = \frac{X - \mu}{\sigma} \quad (1)$$

wherein $\mu$ is a mean of current data collected in the Internet of Vehicles, and $\sigma$ is a standard deviation of the current data;

S2.2.4: performing standardized analysis of the data of the Internet of Vehicles through data collection and data preprocessing;

S2.3.1: iterating data for plurality of times when training;

S2.3.2: extracting features of the data of the Internet of Vehicles by using the CNN, wherein a first layer of the CNN is an input layer of the CNN;

S2.3.3: using a second layer as a convolutional layer to extract the features, and the convolutional layer using a sigmoid or tanh function to increase rates of convergence and training, wherein each convolutional layer comprises two processes of convolution operation and nonlinear activation; and the feature map of the current layer is obtained through the convolution kernel by performing convolution operation on output feature map of a previous layer or an original feature map:

$$X_j^l = \Sigma_i X_i^{l-1} \otimes K_{ij}^{l-1} + b_j^l \quad (2)$$

wherein $X_j^l$ represents an input of a j-th position in a feature map of a l-th layer after convolution, while $X_i^{l-1}$ represents an i-th input matrix in a (l−1)-th layer, $K_{ij}^{l-1}$ represents a convolution kernel connecting the i-th input matrix and the j-th position between the l-th layer and the (l−1)-th layer, and $b_j^l$ represents a first offset from the j-th position in the feature map of the l-th layer;

S2.3.4: sampling the features by pooling layers, with LeakyRelu for activation:

$$f(x) = \max(0, x) \quad (3)$$

wherein when a value of a standardized feature x of the Internet of Vehicles is less than 0, a value of $f(x)$ is 0; and when the value of the standardized feature x of the Internet of Vehicles is greater than 0, the value of $f(x)$ is x;

S2.3.5: connecting the extracted features by a fully connected layer to form an overall feature, and inputting the overall feature to the LSTM, wherein an output of a neuron of the fully connected layer is calculated:

$$y_j^l = \Sigma_i w_{ij}^l * x_i^{l-1} + b_j^l \quad (4)$$

wherein $y_j^l$ represents the calculated output result of a j-th neuron among neurons in a l-th fully connected layer, while $w_{ij}^l$ represents a connection weight for a i-th feature in the feature map of the (l−1)-th layer and a j-th neuron in the l-th layer, $x_i^l$ represents a value of the i-th feature in the feature map of the (l−1)-th layer, and $b_j^l$ represents an offset of the j-th neuron among neurons in the l-th fully connected layer;

S2.3.6: controlling feedback by using a group of gate functions in the LSTM network, such that short-term errors are deleted and continuous characteristics are retained; using p(t), g(t), $f$(t) and q(t) in the LSTM for outputting, where p(t) is an input gate, which is a number of the feature values of the data of the Internet of Vehicles; g(t) is an update gate, which is a number of layers of the recurrent neural network and defaults to 1; $f$(t) is a forget gate, which is a dimension of the input matrix calculated with a first weight, a third offset and the input gate; q(t) is an output gate, which is a result calculated with a vector formed by matrix joining a second weight, a forth offset, the forget gate and the update gate; and previously learned feedback s(t) and current output h(t) are determined through two types of control gates σ and tan h:

$$s(t) = \sigma(f(t)) * s(t-1) + \sigma(p(t)) * \tanh g(t) \quad (5)$$

$$h_t = \tanh s(t) * \sigma(q(t)) \quad (6)$$

learning, by the LSTM, an input by adjusting weights and a value of σ in the LSTM and thus effectively generating a time feature among input data in an output;

S3: reading the data from the HDFS for processing and inputting the data to the CNN-LSTM combined deep learning algorithm model for recognizing the data; and S4: dividing the data into a plurality of RDDs for batch training with a preset number of iterations.

6. The intrusion detection system for Internet of Vehicles based on Spark and combined deep learning according to claim 2, wherein the step S2.1.4 comprises collecting protocols that comprises TCP, UDP, and ICMP; network connection states that comprises OTH, REJ and RSTO; and network services that comprises auth, bgp, http, ftp, and telent.

7. The intrusion detection system for Internet of Vehicles based on Spark and combined deep learning according to claim 2, wherein in the step S2.1.5, the abnormal intrusion data comprises DoS, Probing, R2L, and U2R, and specific classifying labels comprise back, land, neptune, pod, ipsweep and nmap.

8. The computer readable storage medium according to claim 4, wherein the step S2.1.4 comprises collecting protocols that comprises TCP, UDP, and ICMP; network connection states that comprises OTH, REJ and RSTO; and network services that comprises auth, bgp, http, ftp, and telent.

9. The computer readable storage medium according to claim 4, wherein in the step S2.1.5, the abnormal intrusion data comprises DoS, Probing, R2L, and U2R, and specific classifying labels comprise back, land, neptune, pod, ipsweep and nmap.

* * * * *